Figure 18:
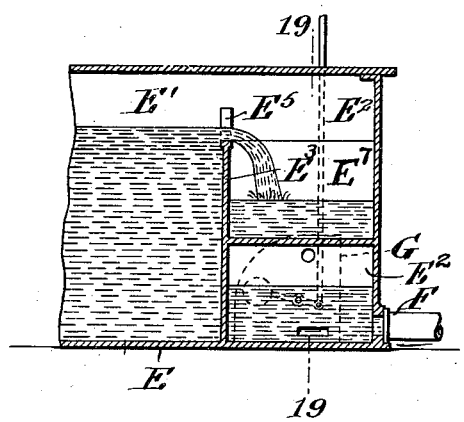

G. H. GIBSON.
COMBINATION WATER HEATING AND MEASURING APPARATUS.
APPLICATION FILED FEB. 1, 1911.
1,015,556.
Patented Jan. 23, 1912.
6 SHEETS—SHEET 1.
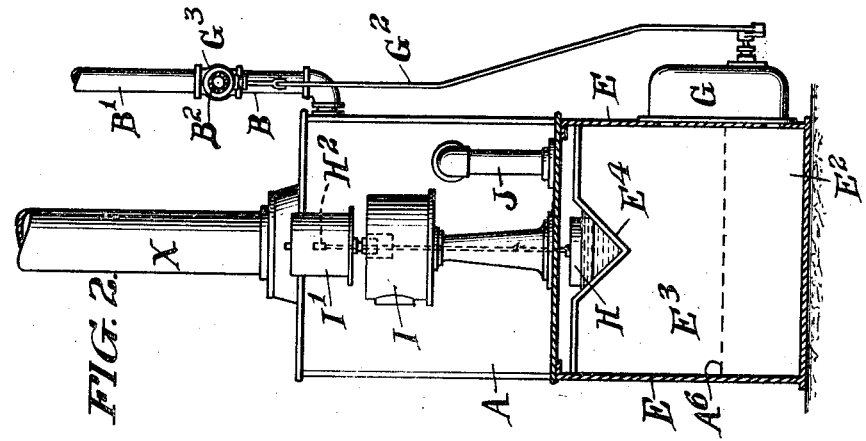
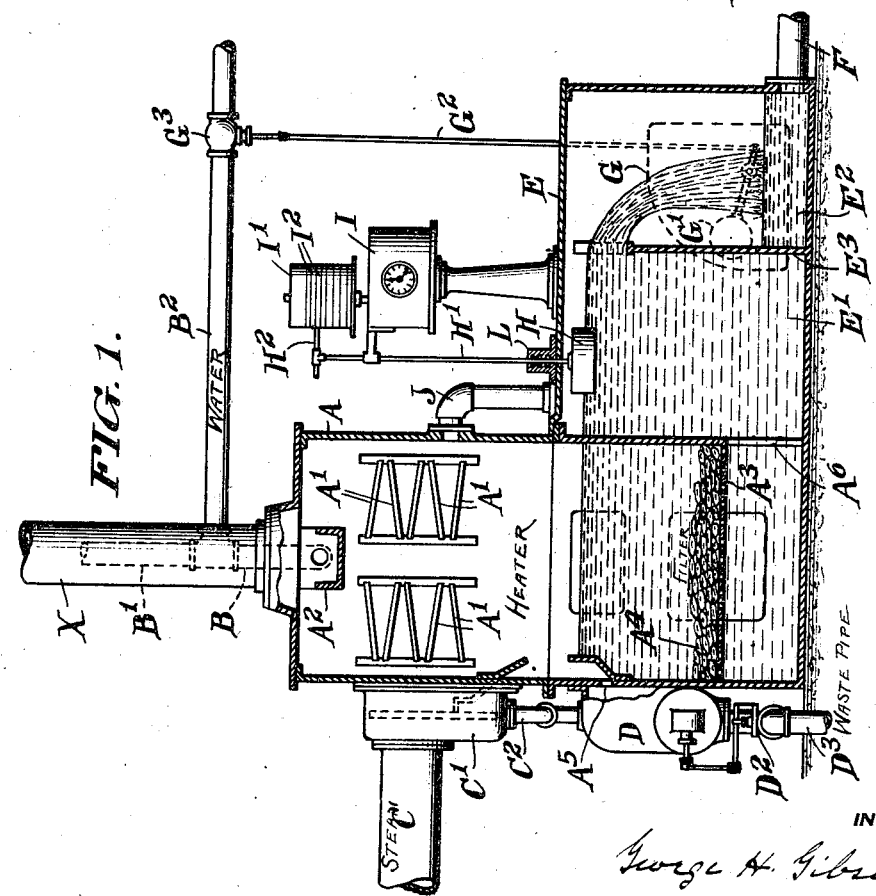
INVENTOR
George H. Gibson
WITNESSES
BY
ATTORNEY

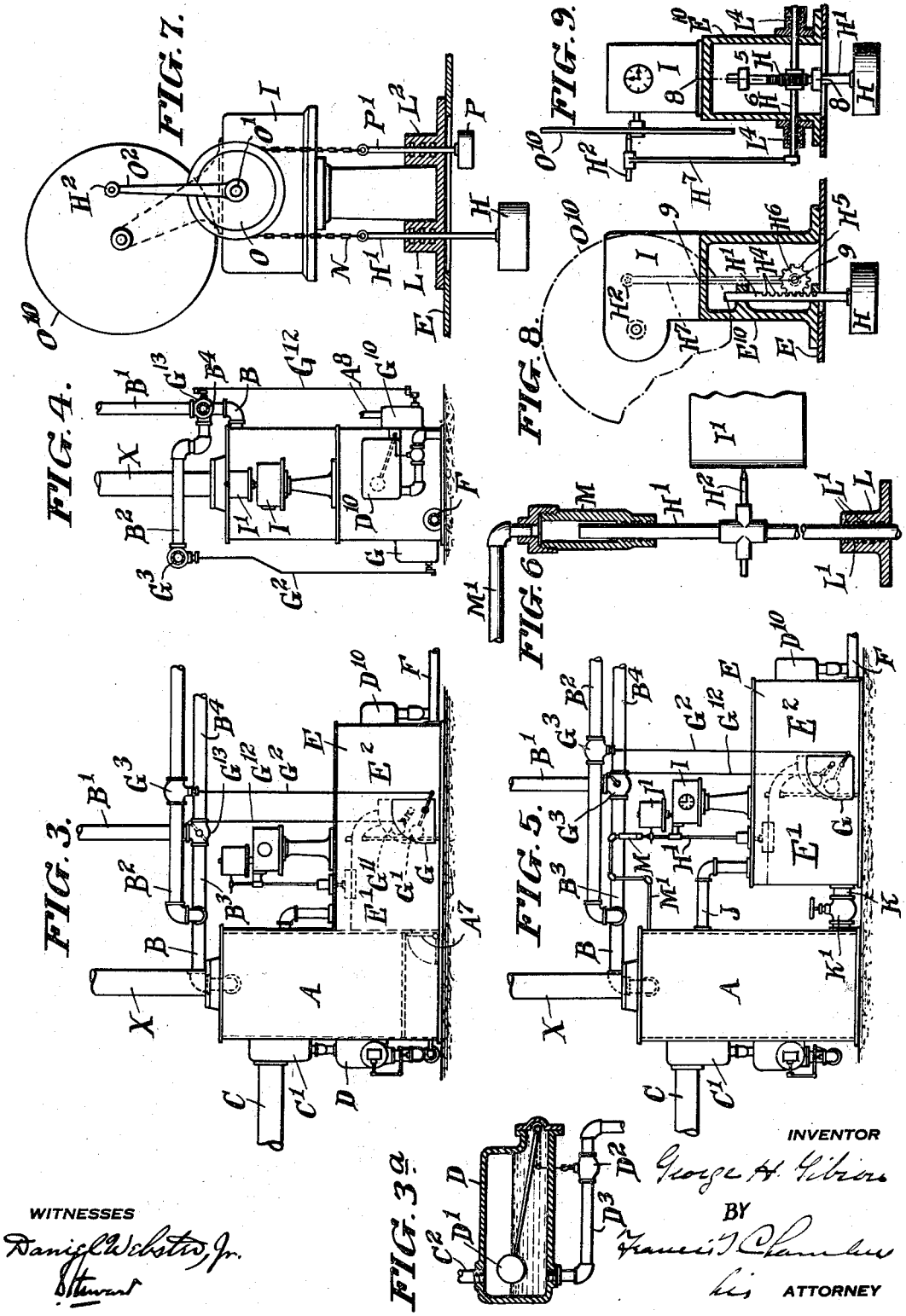
G. H. GIBSON.
COMBINATION WATER HEATING AND MEASURING APPARATUS.
APPLICATION FILED FEB. 1, 1911.
1,015,556.
Patented Jan. 23, 1912.
6 SHEETS—SHEET 2.

G. H. GIBSON.
COMBINATION WATER HEATING AND MEASURING APPARATUS.
APPLICATION FILED FEB. 1, 1911.
1,015,556.
Patented Jan. 23, 1912.
6 SHEETS—SHEET 3.
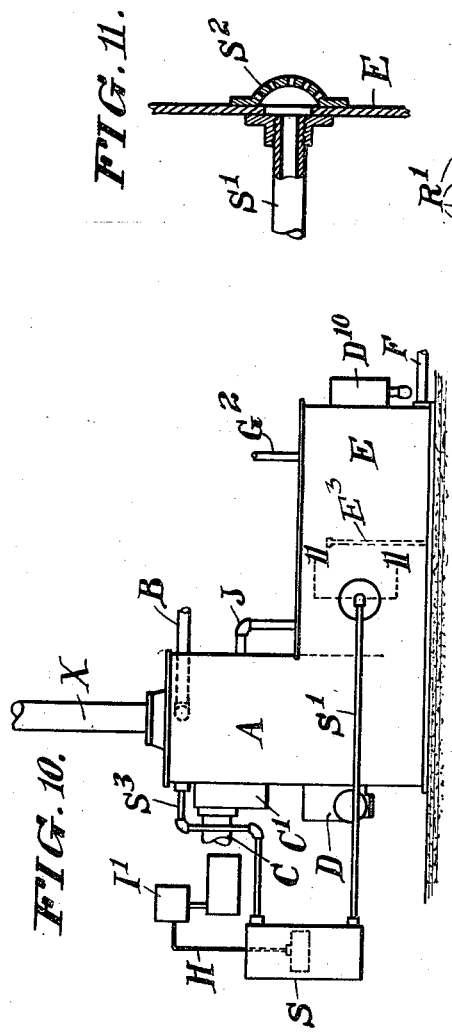
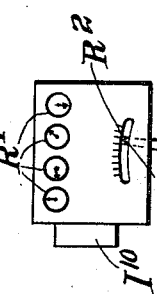
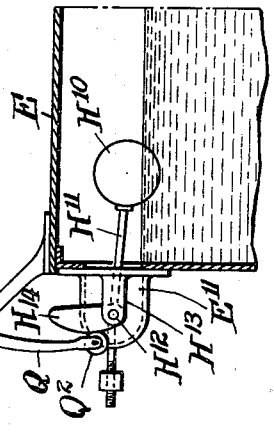
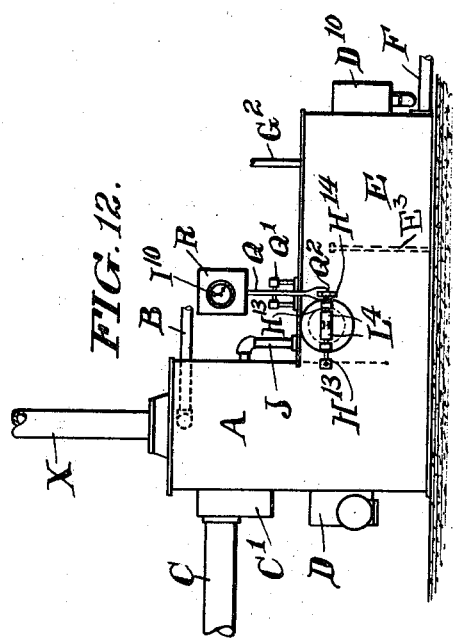
WITNESSES
INVENTOR
BY
ATTORNEY

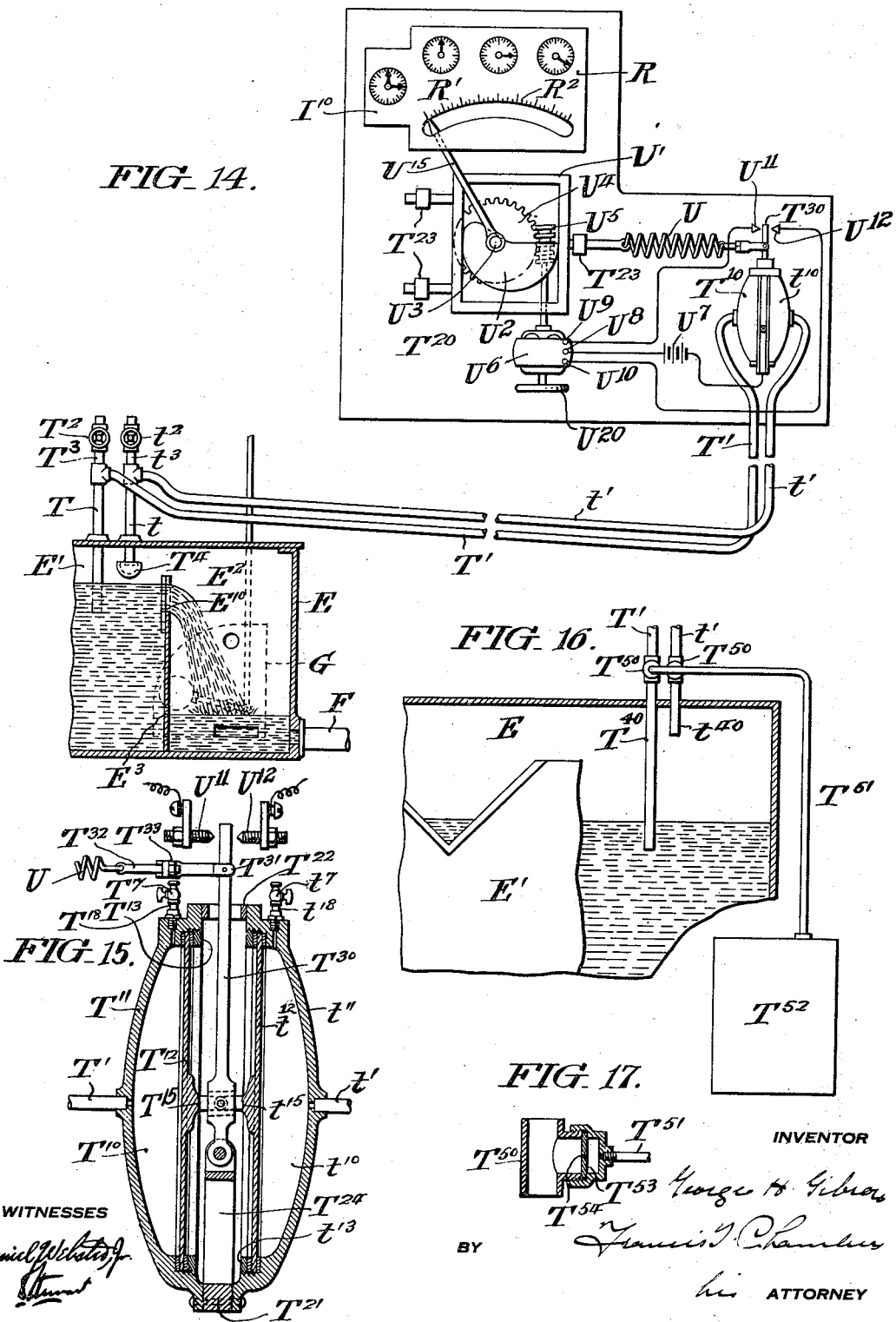

G. H. GIBSON.
COMBINATION WATER HEATING AND MEASURING APPARATUS.
APPLICATION FILED FEB. 1, 1911.

1,015,556.

Patented Jan. 23, 1912.

6 SHEETS—SHEET 5.

WITNESSES
Daniel Webster, Jr.
S Stewart

INVENTOR
George H. Gibson
BY Francis T. Chambers
his ATTORNEY

G. H. GIBSON.
COMBINATION WATER HEATING AND MEASURING APPARATUS.
APPLICATION FILED FEB. 1, 1911.

1,015,556.

Patented Jan. 23, 1912.

6 SHEETS—SHEET 6.

INVENTOR

George H. Gibson

WITNESSES

BY

ATTORNEY

UNITED STATES PATENT OFFICE.

GEORGE H. GIBSON, OF MONTCLAIR, NEW JERSEY, ASSIGNOR TO JOSEPH S. LOVERING WHARTON, WILLIAM S. HALLOWELL, AND JOHN C. JONES, ALL OF PHILADELPHIA, PENNSYLVANIA, A FIRM.

COMBINATION WATER HEATING AND MEASURING APPARATUS.

1,015,556.   Specification of Letters Patent.   Patented Jan. 23, 1912.

Application filed February 1, 1911. Serial No. 605,879.

*To all whom it may concern:*

Be it known that I, GEORGE H. GIBSON, a citizen of the United States, residing in Montclair, in the county of Essex and State of New Jersey, have invented a certain new and useful Improvement in Combination Water Heating and Measuring Apparatus, of which the following is a true and exact description, reference being had to the accompanying drawings, which form a part thereof.

The general object of the invention is to provide in combination with simple and effective apparatus for heating water by the direct action of steam injected into it, suitable provisions for measuring the water heated.

More specifically, the object of the invention is to combine with a water heater of the well known open feed water type suitable provisions for passing the water issuing from the heating chamber over a weir of suitable form, and in conjunction with said weir for measuring the amount of water flowing over the weir.

In carrying out my invention, I arrange the weir in a measuring chamber which is divided into two compartments by the weir and connect one compartment of the weir directly to the water heater tank. In most cases I prefer to combine the heater tank and the measuring chamber in a single compact mechanical structure, and utilize the water purifying or filter screen of the heater tank as a means for obtaining a quiet flow of water into the measuring chamber and an avoidance of currents tending to disturb the water level therein. I prefer to control the supply of water to the heater automatically, in response to variations in the water level at the outlet side of the weir, preferably also I connect the steam space of the heater tank and the steam space of the measuring chamber, to equalize the pressure conditions therein, and this insures the same or substantially the same water level in the tank and in the measuring chamber.

I may measure the amount of water flowing over the weir by measuring the varying accumulation of water on the supply side of the weir above the lowermost level of overflow, since the rate of flow over the weir, at any instant, is, as is well known, a function of the accumulation of water on the supply side of the weir at that instant. To determine the varying accumulation of water on the supply side of the weir I may proceed directly as by means of a float mechanism to measure the varying height of water level on the supply side of the weir, or I may ascertain this indirectly by measuring the hydrostatic pressure on the supply side of the weir at a determined level below the water surface level normally prevailing on the supply side of the weir. In practice, the level at which the hydrostatic pressure on the supply side of the weir is measured will usually be at or below the level of the apex or apices of the weir notch or notches, but where the conditions are such that water flows over the weir at all times and the surface of the water on the supply side of the weir never falls to the level of the weir notch apex or apices, it may sometimes be convenient to measure the hydrostatic pressure of the water on the supply side of the weir at some level above the level of the weir notch apex or apices.

Instead of ascertaining the rate of flow by determining the varying accumulation of water on the supply side of the weir I may so shape the weir that the latter divides the water flowing over it into two or more streams in such manner that the rate of flow in one of said streams is a constant fraction of the total rate of flow, regardless of the variations in the latter, and then directly measure the amount of water flowing in said one stream. By proceeding in this manner I reduce the amount of water directly measured sufficiently so that it may be readily and accurately measured by apparatus which is comparatively small and inexpensive, whereas, similar apparatus of capacity sufficient to directly measure the entire amount of water flowing would be too bulky and on that account too expensive to permit of its practical use.

The need of simple and effective apparatus to measure the water passing through heaters, particularly in the case of open feed water heaters employed for preheating boiler feed water, has long been recognized by those having to do with the operation of steam generating plants, inasmuch as such measurement is desirable for various reasons, one of the more important of which is the check thus had on the manner in which such plants are operated. The present invention is well adapted for such use.

In the accompanying drawings and descriptive matter I have illustrated various forms of the apparatus which may be used in carrying out my invention.

Figure 19:
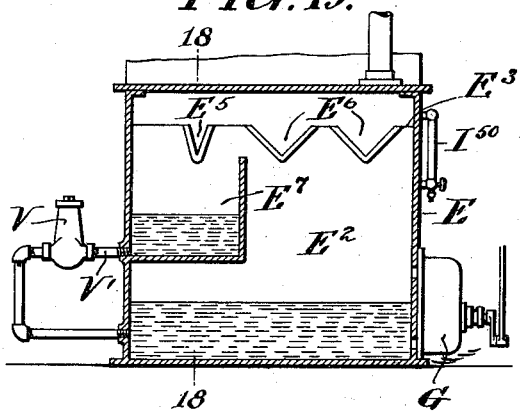
Figure 20:
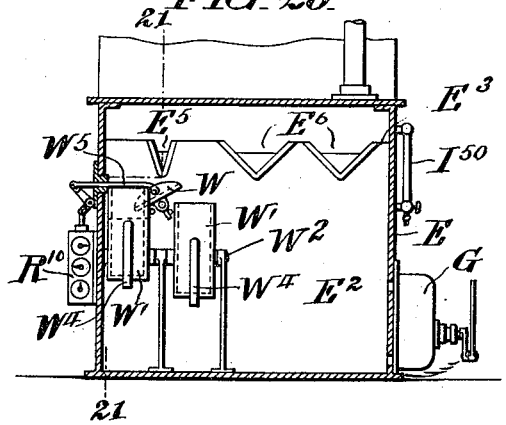
Figure 21:
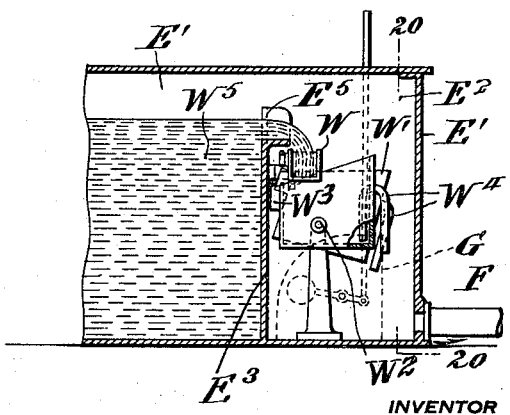
Figure 22:
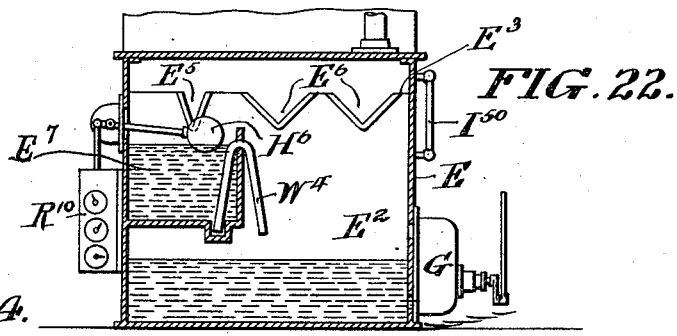
Figure 24:
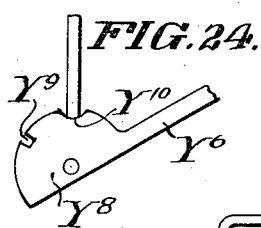
Figure 23:
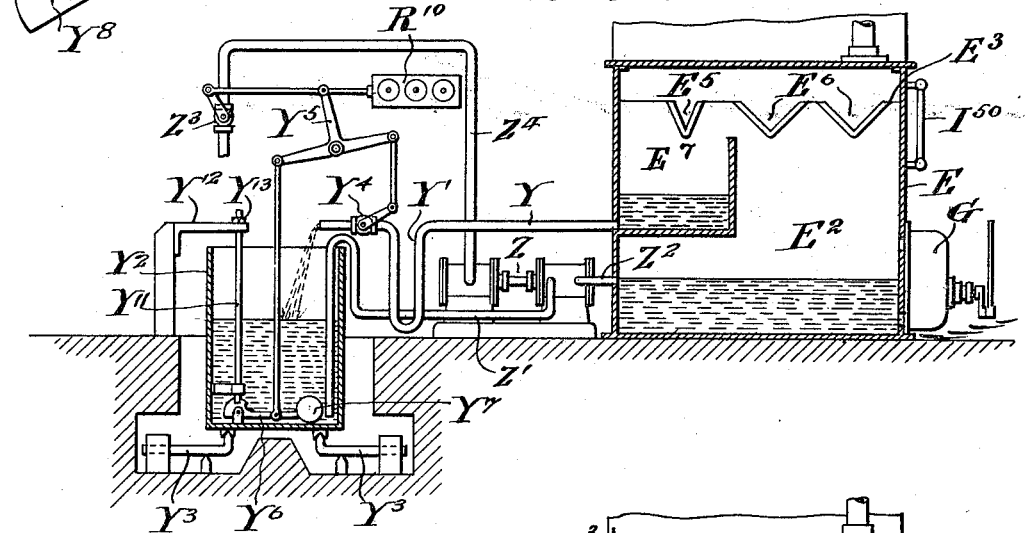
Figure 25:
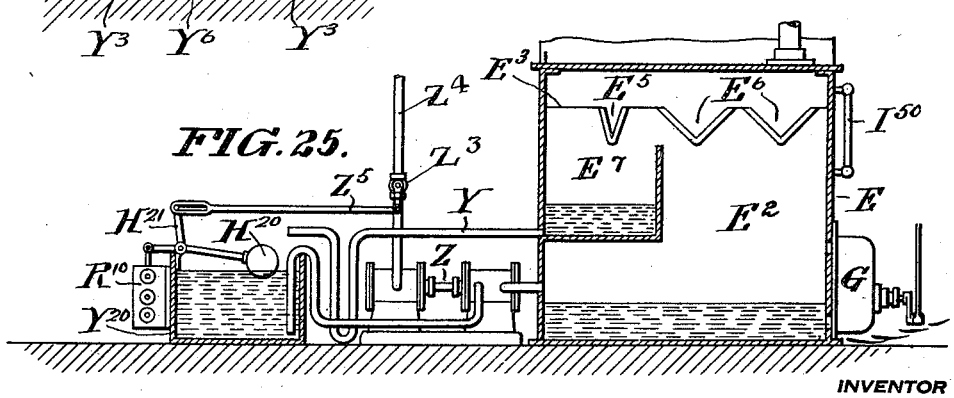

Of the drawings, Figure 1 is a sectional elevation of one form of combined water heating and measuring apparatus. Fig. 2 is a sectional elevation taken transversely to Fig. 1. Fig. 3 is a side elevation of a combined water heating and measuring apparatus differing in some respects from that shown in Figs. 1 and 2. Fig. 3$^a$ is a sectional elevation of an overflow box employed in various forms of the invention. Fig. 4 is an end elevation of the apparatus shown in Fig. 3. Fig. 5 is a view taken similarly to Fig. 3, but illustrating still another form of the invention. Fig. 6 is a sectional elevation illustrating details of construction which may be employed in connection with the measuring float. Fig. 7 is an elevation partly in section illustrating a modification in the water level measuring and recording provisions. Fig. 8 is an elevation partly in section on the line 8—8 of Fig. 9, and Fig. 9 is an elevation taken transversely to Fig. 8 and partly in section on the line 9—9 of Fig. 8, illustrating a further modification of the measuring and recording provisions. Fig. 10 is an elevation of a combined water heating and measuring apparatus in which the measuring provisions are located at a distance from the measuring receptacle. Fig. 11 is a partial section on the line 11—11 of Fig. 10. Fig. 12 is an elevation of combined heater and measuring structure illustrating a modified form of measuring and indicating apparatus, and Fig. 13 is a partial section taken at right angles to Fig. 12. Fig. 14 is an elevation partly diagrammatic and partly in section illustrating an arrangement for measuring and registering the flow, in which the accumulation of water on the supply side of the weir is determined hydrostatically. Fig. 15 is a sectional elevation of a portion of the pressure measuring apparatus of Fig. 14. Fig. 16 is a view taken similarly to, and illustrating a modified form of a portion of the apparatus shown in, Fig. 14. Fig. 17 is a sectional elevation of a part employed in the modification shown by Fig. 16. Fig. 18 is a partial sectional elevation taken on the line 18—18 of Fig. 19, illustrating one arrangement for measuring the flow over the weir by directly measuring a portion only of the water flowing. Fig. 19 is a partial sectional elevation taken on the line 19—19 of Fig. 18. Figs. 20 and 21 are partial sectional elevations taken on the line 20—20 of Fig. 21, and the line 21—21 of Fig. 20, respectively, illustrating a second form of apparatus for directly measuring a portion only of the flow over the weir. Fig. 22 is a view taken similarly to Fig. 19 illustrating a third form of apparatus for directly measuring a portion only of the flow over the weir. Fig. 23 is a view taken similarly to Fig. 19 showing a fourth form of apparatus for measuring a portion only of the flow over the weir. Fig. 24 is a partial elevation of a detail employed in the construction shown in Fig. 23, and Fig. 25 is a view taken similarly to Fig. 19 showing still another form of apparatus for measuring a portion only of the flow over the weir.

In the construction shown by Figs. 1 and 2, A represents the body portion or tank of an open feed water heater, which in its general construction and arrangement may be identical with the common form of this type of heater, which has been well known and in common use for many years. In the form illustrated the heater is provided with water spreading trays A$'$ upon which the water to be heated overflows from the distribution box A$^2$. In the lower end of the heater is arranged a perforated plate A$^3$ upon which coke or the like purifying and filtering material A$^4$ is placed. A$^5$ represents a discharge orifice above the normal water level in the tank through which water may overflow under some conditions, as hereinafter explained, and A$^6$ represents the main discharge orifice through which the water heated in the heater is discharged. The water to be heated is admitted through the pipe B, which, as shown, has two branches, one B$'$, adapted to lead from a hot well of the condenser or like source of water, while the other, B$^2$ serves to supply the makeup water. The steam for heating the water, which may be, and ordinarily is, exhaust steam from engines, is admitted through pipe C to a separator C$'$ of common form. The oil and other impurities separated from the steam in the separator C$'$ pass through the pipe C$^2$ to the overflow box D into which the port A$^5$ opens. Within the overflow box D, (see Fig. 3$^a$) is arranged a float D$'$ which serves, when the liquid level in the box D rises above a predetermined height, to open a valve D$^2$ in the overflow or waste pipe D$^3$. X represents the standpipe through which air and excess steam may escape from the tank A.

In the form shown in Figs. 1 and 2, a measuring box or receptacle E is secured to the side of, and forms a part of a unitary structure with the heater tank A. The receptacle E is divided into two compartments E$'$ and E$^2$ by a partition or barrier E$^3$. The baffle E$^3$ does not extend to the top of the receptacle but serves as a weir over which water overflows from the compartment E$'$ to the compartment E$^2$. The weir may be shaped at its upper edge to provide an overflow edge of approved shape and adapted to insure a rate of flow from the compartment E′ into compartment E² which will bear a definite and determined relation to the water level in the compartment E′. In practice, I prefer to employ one or more weir discharge orifices in the form of the V shaped notch E⁴, shown in Fig. 2. The discharge orifice A⁶ from the heater tank A proper, opens directly into compartment E′ at the lower end of the latter. The orifices A⁶ should be relatively larger in cross section to obtain the equable flow of water from the tank A into the compartment E′ necessary to avoid fluctuations in the height of the water level in the compartment E′. With the arrangement shown, the filter screen formed by the perforated plate A³, and the filter material supported thereon, aids materially in producing the uniformity of flow into compartment E′ desired, and this screen and filter layer make unnecessary any separate provisions for preventing currents likely to disturb the water level in the measuring chamber. With open feed water heaters of the kind shown, the pressure within the tank A is ordinarily slightly above that of the atmosphere and in some installations, and under some conditions of operation, the pressure within the tank A may be ten pounds or so above that of the atmosphere. This makes it quite desirable that the pressure in the steam space in compartments E′ and E² should be the same as the steam pressure within the tank A. This equalization in steam pressure is obtained by equalizing connections such as are formed by the pipe J connecting the steam spaces in the tank A and receptacle E. In practice, to avoid fluctuations in pressure, the cross section of the equalizing connection should be comparatively large. The water heated is withdrawn from the heating and measuring structure through the service discharge connection F which leads from the lower end of the compartment E² and may be connected to the inlet of a boiler feed pump or the like. The supply of make up water is controlled by a valve G³ in the makeup supply pipe B², and the valve G³ is automatically controlled by means of a float G′ arranged within the compartment E² or preferably within a float box G open to the compartment E². The float G′ is connected to and operates the valve G³ through suitable connections G². The arrangement is such that when the water level in compartment E² rises to a certain predetermined height the supply of makeup water is cut off by the valve G³ and this valve opens only when the water level in compartment E² falls below such predetermined level. Since the rate of flow of the water from the compartment E² varies according to a law, determined by the form of the weir discharge edge or orifice, with variations in the height of the water level in the compartment E′, the rate of flow at any instant may be measured by means of provisions serving to measure the water level in the compartment E′. The measuring provisions may include or have combined therewith, suitable means for indicating, recording, integrating and registering the measurements obtained, as seems desirable. In Figs. 1 and 2, I have shown measuring, indicating and recording provisions, comprising a float H located within the compartment E′ and rising and falling with the rise and fall of the water level therein. To this float as shown in Figs. 1 and 2, is connected a rod or stem H′ passing through a stuffing box L carried by the upper wall of the receptacle E. As shown in Figs. 1 and 2, the rod H′ carries a pen, pencil, or like light scribing device H² adapted to trace a line upon the surface of the drum I′, or more ordinarily upon a record sheet of paper secured on the drum I′. I represents a clock mechanism for rotating the drum I′ at a uniform velocity. For convenience, the drum, or record sheet carried by it, may have graduation lines I² formed on it, serving to directly indicate the rate of flow in convenient units when the pencil H² is moved by the float H to the corresponding level.

With the arrangement shown in Figs. 1 and 2, it will be apparent that in case the water supplied by the pipe B′ and that derived from the condensation of steam admitted through the pipe C, materially exceeds the amount of water taken out of the apparatus through the service connection F, the overflow through the port A⁵ will not be effective to prevent the water level from building up in the compartment E² to a height which will affect the flow over the weir E⁴ and cause the float H and connected mechanism to apparently measure a greater flow of water over the weir than actually takes place. With all forms of my invention I usually prefer to limit the possibility of error in this way by making the capacity of the compartment E² ample to hold a quantity of water greater than that which can accumulate in normal operation in tank A and compartment E′ above the level of the lowermost portion of the discharge edge of the weir E⁴. In practice, however, an objectionable excess accumulation of water in the apparatus rarely occurs, except when it is intentionally desired to raise the water level in the tank A to produce a limited overflow therefrom through the discharge port A⁵ in order to float or skim off oil or like impurities collecting at the upper surface of the water in tank A. To avoid an accumulation of water within the heating and measuring apparatus, however, I may employ the arrangement illustrated somewhat diagrammatically in Figs. 3 and 4. In the arrangement shown by these figures the tank A and its adjuncts and the receptacle E may be identical with the corresponding parts shown in Figs. 1 and 2, except that I sometimes may provide a flap valve $A^7$ and a handle $A^8$ therefor, by means of which the port $A^6$ may be closed from time to time, say for a few minutes each day, to thereby quickly build up the water level in the tank A to the height at which the oil or like impurities accumulated at the top of the water in the tank A may be floated off through the overflow box D. With the arrangement shown in Figs. 3 and 4, I control the flow of water through the makeup supply pipe $B^2$ by a valve $G^3$ and float box G and connections, as before. In addition, I provide a second float $G^{11}$ arranged in the compartment $E^2$, or preferably, as shown, in a float box $G^{10}$ open to the compartment $E^2$. By means of the float $G^{11}$ and connecting rod $G^{12}$ I operate the valve $G^{13}$ which normally serves to pass the water from the pipe $B'$ through the pipe section $B^3$ to the heater supply pipe B. On a rise in water level in the compartment $E^2$ to a predetermined height above that at which the float $G'$ closes the valve $G^3$ the valve $G^{13}$ is shifted by the float $G^{11}$ into the position in which the pipe $B^3$ is closed and the water normally passing through it from the pipe $B'$ is diverted into the pipe $B^4$ running to a waste or storage tank. This insures, under all normal conditions, that the water level in the compartment $E^2$ remains below the height which would interfere with an accurate measurement of the water withdrawn from the heating and measuring apparatus through the service connection F. As an additional safety device, however, I sometimes prefer to provide an overflow connection from the compartment $E^2$. This may consist, as shown, in an overflow box $D^{10}$ similar to the overflow box D and open to the compartment $E^2$ at a level slightly above that at which the float $G^{11}$ operates valve $G^{13}$ to connect pipes $B'$ and $B^4$. The overflow box $D^{10}$ has associated with it parts corresponding to the parts $D'$, $D^2$ and $D^3$, associated with the overflow box D.

While in the form of my invention, now preferred by me, I unite the measuring receptacle E in a unitary structure with the heating tank A, the tank and receptacle may in some cases be advantageously formed as separate structures connected as shown in Fig. 5, by a pipe K, preferably controlled by a valve $K'$. Where, as is usual, the pressure in the steam space in the receptacle E is above that of the atmosphere, suitable provisions should be made for preventing the escape of steam from the receptacle E along the float stem $H'$ through the passage in the wall of the receptacle receiving the steam, while at the same time, the frictional resistance to the up and down movement of the float and stem should be reduced to a minimum. The prevention of steam leakage without the production of material frictional retardation can be obtained by means of the labyrinth packing L, such as is shown best in Fig. 6. The series of grooves between the ribs $L'$ serve in a well known manner to prevent any appreciable leakage of steam between the packing and the stem, even though the stem does not actually touch the ribs, but is separated therefrom by film like spaces.

With the arrangement shown in Figs. 1 to 4 inclusive, there will be a slight unbalancing effect of the fluid pressure acting within the compartment E upon the float H outward through the packing L. To compensate for this, I may provide a chamber M, into which the upper end of rod $H'$ enters while the interior of the chamber M is connected to the steam space of the tank A by means of the pipe $M'$, as shown in Figs. 5 and 6. Another method of compensating for the unbalanced fluid pressure acting on the float and stem is illustrated in Fig. 7, wherein the stem $H'$ is connected at its upper end to a flexible member N which runs over a pulley O and has its other end connected to the stem $P'$ carrying the weight P. The weight P is located within the receptacle and the stem $P'$ which is of the same cross section as the float stem $H'$ passes through a stuffing box $L^2$ which may be similar to the stuffing box L. With this arrangement the unbalanced fluid action on the stem $H'$ is exactly balanced by the unbalanced fluid pressure action upon the weight P and its stem $P'$. As the float H rises and falls the pulley O is correspondingly rotated, and the indicating, recording, or like measuring apparatus, may be connected to and operated by the shaft $O'$ to which the pulley O is fast. For instance, a pen or pencil $H^2$ may be carried by an arm $O^2$ secured to the shaft $O'$ and made to travel along the surface of the clock rotated disk $O^{10}$, so that the recording operation is similar to that with the well known Bristol recording gages. With this arrangement also, the amplitude of movement of the recording point is desirably greater than the amplitude of movement of the float H. Another means which may sometimes be employed with advantage to avoid any unbalanced steam action and also to lessen the frictional resistance to the movements of the float, is illustrated in Figs. 8 and 9, wherein the stem $H'$ of the float H is located within the receptacle E or within the extension $E^{10}$ thereof, and is formed with rack teeth $H^4$ meshing with a spur gear $H^5$ carried by a shaft $H^6$ which extends through opposite walls of the receptacle E or the extension $E^{10}$ thereof through packings $L^4$ similar to the packing L above described. With this arrangement, there is no unbalanced steam action affecting the operation of the float and the frictional resistance to the rotative movements of the shaft $H^6$ is substantially less than the frictional resistance which would oppose, for instance, the movement of the shaft $H^6$ axially through the packing $L^4$. The shaft $H^6$ may have fixed to it an arm $H^7$ carrying the pencil $H^2$ and the latter may be arranged to make its record on the disk $O^{10}$ rotated by the clock mechanism I.

While in the form of apparatus hereinbefore referred to I have shown the float H within the measuring receptacle proper, it is, in many cases, more convenient to locate it at a distance from the receptacle E in order to obtain a more convenient location of the measuring apparatus. This may be accomplished by locating the float in a separate float chamber S, as shown in Figs. 10 and 11, the float chamber S being connected at its lower end to the measuring receptacle E, at the inlet side of the weir $E^3$ as by pipe $S'$. The connection between the interior of the measuring receptacle and the pipe $S'$ should be such as to guard against any disturbances in the water level, due to the flow through the pipe $S'$. A rose or perforated plate or dirt guard $S^2$ is placed over the mouth of the pipe $S'$. The steam pressure in the steam space of the float receptacle S should be equalized with the pressure in the steam space in the heating tank A and measuring receptacle E. This may be accomplished by means of the equalizing connection $S^3$.

In the arrangements shown in Figs. 12 and 13, the float $H^{10}$ is carried by the arm $H^{11}$ secured to a rock shaft $H^{12}$ which projects from the chamber E, or preferably as shown, from the extension $E^{11}$ thereof, through the stuffing boxes $L^4$. To reduce the friction, the shaft $H^{12}$ may well be journaled in suitable external bearings $H^{13}$ separate from the stuffing boxes $L^4$. The shaft $H^{12}$ has secured to it an external cam $H^{14}$ which serves to shift a lever Q as the float $H^{10}$ rises and falls. As shown the lever Q is fulcrumed at $Q'$ and is provided with an antifriction roll $Q^2$ which directly engages the cam $H^{14}$. The lever Q may serve as the actuating member of any suitable indicating, recording or integrating mechanism. As shown, it enters the box R of a registering mechanism which includes a set of registering dials $R'$ and a clock mechanism $I^{10}$ which may serve to drive registering wheels back of the dials $R'$ through suitable intermediate gearing the ratio of transmission of which is varied by the lever Q. I have not illustrated the details of the registering wheels and intermediate gearing, as such details form no part of my present invention, and moreover, various forms of such mechanism have long been known. A pointer $Q^3$ carried by the lever Q in conjunction with the dial $R^2$ serves as the means for indicating the rate of flow of water at any instant.

The manner in which the rate of flow over the weir varies as the water level in the chamber $E'$ rises and falls, depends upon the shape of the discharge edge of the weir. This has long been known and the discharge formulæ for numerous different forms of weirs have been determined. With the discharge taking place through a V notch, for instance, the rate of flow will be substantially in proportion to the fifth power of the square root (5/2 power) of the height of the water level in chamber $E'$ above the bottom of the discharge notch. By suitably shaping the cam the movements of the lever Q, as the float $H^{10}$ rises and falls, may be made directly proportional to the differences between the rates of flow over the weir at the different heights of water level in the chamber $E'$. Of course, in any case, the cam should be designed in accordance with the discharge formula of the particular weir employed.

The difference between the hydrostatic pressure at any point below the surface of a body of liquid and the pressure on the surface of the liquid is proportional to the depth of said point below said surface, and in Figs. 14 to 17 inclusive, I have taken advantage of this relation between the pressure and height of surface level to determine hydrostatically the accumulation of water on the supply side of the weir and thereby, the flow over the weir. In Fig. 14, the weir box E may be assumed to be constructed and arranged with reference to the water heater system, as in the forms of apparatus hereinbefore described. In Fig. 14 a vertical pressure tube T is extended into the compartment $E'$ with its open end at the level of the apex $E^{10}$. The pipe $T'$ leads from the upper end of the pipe T to the pressure chamber $T^{10}$ of the pressure measuring apparatus which may be located at a distance from the weir receptacle E and need not be at the same level therewith. The pressure chamber $T^{10}$ in the particular form shown in Figs. 14 and 15, comprises a body portion $T^{11}$ in the shape of a shallow cup and connected to brackets $T^{21}$ and $T^{22}$ extending from a suitable support or base $T^{20}$. The pressure chamber $T^{10}$ has a movable wall portion formed with a flexible disk or a diaphragm $T^{12}$ of any suitable material, such as soft copper, which is detachably secured at its periphery to the body $T^{11}$ by the ring nut $T^{13}$, suitable packing rings being provided to insure tight joints. The disk $T^{12}$ has a central projection $T^{15}$ pivotally connected to a lever $T^{30}$ pivoted to an extension $T^{24}$ of the bracket $T^{21}$.

Various provisions may be made for exerting the varying force upon the lever $T^{30}$ necessary to balance the outward thrust upon the lever $T^{30}$ exerted by the diaphragm $T^{12}$ without permitting any substantial movement of the diaphragm. In the arrangement shown in Fig. 14 for accomplishing this automatically, the lever $T^{30}$ is extended through the bracket $T^{22}$ which is slotted and to the upper end of the lever a yoke $T^{31}$ is pivotally connected. A rod $T^{32}$ forms an extension of the yoke $T^{31}$ which may be adjusted by means of the nut $T^{33}$. A tension spring U connects the rod $T^{32}$ and thereby the lever $T^{30}$ to a tension adjusting member U', in the form of an apertured plate having guide extensions sliding through brackets $T^{23}$ projecting from the base member $T^{20}$. Within the aperture in the member U' is located a cam $U^2$. The cam is carried by a shaft $U^3$ extending transversely to the plane of movement of the member U' and through the latter takes the pull of the spring U. The shaft $U^3$ has secured to it a gear wheel $U^4$ meshing with a worm $U^5$ carried by the shaft of the electric motor $U^6$. The latter is supplied with current from a suitable source, as the battery $U^9$ connected between one terminal $U^8$ of the motor and the lever $T^{30}$. The other motor terminals $U^9$ and $U^{10}$ are connected by suitable conductors, one to an adjustable contact $U^{11}$ at one side of the lever $T^{30}$ and the other to the corresponding adjustable contact $U^{12}$ at the other side of the lever $T^{30}$. The arrangement is such that a very slight movement of the lever $T^{30}$ to the left will close a circuit, including the battery $U^7$, lever $T^{30}$, contact $U^{11}$ and the motor terminals $U^9$ and $U^8$, which will cause the motor to revolve in the direction to give the shaft $U^5$ a counter-clockwise rotation and thereby relieve the tension on the spring U sufficiently to permit the lever $T^{30}$ to move out of engagement with the contact $U^{11}$. Similarly a slight movement of the lever $T^{30}$ to the right will cause a circuit to be closed, including the battery $U^7$, lever $T^{30}$, contact $U^{12}$ and motor terminals $U^8$ and $U^{10}$, whereupon the motor will give a clockwise rotation to the shaft $U^3$ and thereby increase the tension on the spring U and move the lever $T^{30}$ out of engagement with the contact $U^{12}$.

Where, as in the apparatus shown, the vapor pressure acting on the upper surface of the liquid in the compartment E' is not necessarily the same as the atmospheric pressure acting on the outer side of the diaphragm $T^{12}$, it is essential for accurate results that this should be compensated for, and in the apparatus disclosed, I employ for this purpose a pressure chamber $t^{10}$ which may be in all respects similar to the pressure chamber $T^{10}$ and comprise parts $t^{11}$, $t^{12}$, $t^{13}$ and $t^{15}$, like the parts $T^{11}$, $T^{12}$, $T^{13}$ and $T^{15}$, respectively. I secure the chamber $t^{10}$ to the brackets $T^{21}$ and $T^{22}$ with the projection $t^{15}$ in line with the projection $T^{15}$ and facing the opposite side of the lever $T^{30}$. The interior of the pressure chamber $t^{10}$ is connected to the pipe $t'$ and the extension $t$ thereof to the interior of the receptacle E above the water level therein.

In the arrangement shown in Fig. 14, I have the entire pressure transmitting system filled with a liquid, as water, and subject both tubes T' and $t'$, so far as possible to the same temperature conditions as by arranging them side by side and in close proximity to each other. To avoid inaccuracies, which might be caused by the presence of air or other gases in the pressure chambers $T^{10}$ and $t^{10}$ and in the pipes leading thereto, I preferably provide means, such as the cocks $T^7$ and $t^7$ to facilitate the removal of air from the pressure chambers and the conduits, and the filling of these chambers and conduits with the desired liquid. These cocks open to the corresponding pressure chambers $T^{10}$ and $t^{10}$ at their highest points. Where the chambers $T^{10}$ and $t^{10}$ are located at or above the level of the connections T and $t$, I preferably depress the pipes T' and $t'$ adjacent the tubes T and $t$, so that any air passing into the latter from receptacle E will tend to accumulate at the upper ends of tubes T and $t$, and small cocks $T^2$ and $t^2$ may be provided through which the accumulated air may be blown out from time to time, particularly, with the apparatus disclosed in which the steam pressure within the chamber E is usually above the atmospheric pressure. The pipe sections $T^3$ and $t^3$, immediately adjacent the cocks $T^2$ and $t^2$ and the pipe sections $T^{18}$ and $t^{18}$ between the cocks $T^7$ and $t^7$, and the chambers $T^{10}$ and $t^{10}$ may advantageously be made of glass, so that any air accumulation therein may be visually detected. To maintain the pipe $t$ full of water I may provide a water seal at its lower end. This may be obtained by means of the cup-like extension $T^4$ formed at the lower part of the pipe $t$ and constantly kept full and overflowing by the condensation of water vapor. By giving the cam $U^2$ the proper contour the angular movements of the shaft $U^3$ may be made proportional to the changes in the rate of flow over the weir while at the same time, the changes in the tension of the spring U resulting from such movements are proportional to the corresponding changes in the difference between the pressures in chambers $T^{10}$ and $t^{10}$.

In the apparatus shown in Fig. 14 an arm $U^{15}$ attached to the shaft $U^3$ enters the box R of a registering mechanism and serves as a pointer playing along the graduated scale $R^2$ to indicate the amount of water flowing at any instant, and also as a means for adjusting the connections between the counting wheels R' of the registering mechanisms and the clock mechanism I¹⁰ which drives the counting train, the construction of Fig. 14 being in this respect like that of Fig. 13. While I prefer to employ some means such as that disclosed in Fig. 14 for automatically adjusting the force balancing the pressure exerted against the movable member or members of the pressure measuring apparatus as the height of a column of water above the level at which the pressure is measured varies, some of the advantages of this method of measuring the pressure and rate of flow may be had without such automatic regulation. For instance, with the apparatus shown in Fig. 14, the hand wheel U²⁰ permits of the manual rotation of the shaft U³ when the motor U is temporarily out of service or is not employed.

In the form of apparatus shown in Figs. 16 and 17 the tubes T⁴⁰ and t⁴⁰, corresponding to the tubes T and t of Fig. 14, enter the weir chamber E as in Fig. 14, and are open at their inner ends to the interior of said chamber. In this form, however, no water seal is provided at the lower end of tube t⁴⁰, and the entire pressure transmitting system is filled with air instead of water. To maintain the pressure transmitting system full of air, I provide means for injecting air into the system continuously but slowly with the result that the air constantly escapes in minute quantities from the tubes T⁴⁰ and t⁴⁰ at their open ends into the weir chamber, and in consequence, the air pressures within the tubes T⁴⁰ and t⁴⁰ respectively, correspond exactly to the hydrostatic pressure at the lower end of the tube T⁴⁰ and to the vapor pressure above the water level in the weir chamber. To continuously provide air in minute streams to the interiors of the tubes T⁴⁰ and t⁴⁰ in the particular form of apparatus illustrated, I connect these tubes to the pressure transmitting pipes T' and t' by fittings T⁵⁰. Each fitting T⁵⁰ contains a diaphragm T⁵³ or the like formed with a fine passage T⁵⁴ through which air under pressure, supplied by a pipe T⁵¹ from a suitable air reservoir T⁵², compressor or the like, may slowly leak. This type of pressure transmitting and measuring apparatus has a number of advantages. With it no errors result from small leaks in any portion of the pressure transmitting system. There is no possibility, of course, of trouble through freezing of the pressure transmitting fluid. The differences in pressure in the pressure chambers of the pressure measuring apparatus, due to variations in temperature conditions of the air in different portions of the pressure measuring system, are, of course, much smaller than where the fluid in the pipes is a liquid. In general, however, I prefer to have the pipes T' and t' in this form of the invention arranged side by side and in close proximity so as to be subjected to the same temperature conditions, at least as to the vertical portions thereof.

Pressure measuring apparatus of the character illustrated in Figs. 14 to 17 inclusive possesses numerous novel and useful characteristics which fit such apparatus for use not only in the specific relation illustrated but generally for use where a sensitive and accurate fluid pressure measuring apparatus is desired. The fact that the movable walls or diaphragms T¹², t¹² are held against appreciable movements contributes largely to the sensitiveness of the apparatus and the accuracy of the results obtained. No claims are made in this application, however, to the specific characteristics of the pressure measuring apparatus of Figs. 14 to 17 inclusive, as this type of apparatus forms the subject matter of my copending application, Serial Number 605,878 filed at even date herewith.

Instead of, or in addition to measuring the flow of liquid over a weir by determining the accumulation of liquid on the supply side of the weir, I consider it sometimes advantageous to form the weir in such manner that the liquid flowing over it will be divided into two or more streams of such character that the amount of liquid flowing in one of said streams will always be a constant fraction of the total amount of liquid flowing, and in consequence, the total flow may be determined by measuring the amount of liquid flowing in one of said streams. This makes it possible to obtain an accurate determination of the amount of liquid flowing with measuring apparatus proper which is smaller, less expensive, and in general more reliable and accurate than similar apparatus of capacity sufficient to measure the total amount of liquid flow. This method of measuring the flow of a liquid, while of general utility, is of peculiar value in determining the flow of hot water through a weir box, connected to, and forming a part of water heating and measuring apparatus, such as have been hereinbefore described.

In Figs. 18 to 25, inclusive, I have illustrated several forms of apparatus for measuring the amount of water flowing in one of the streams into which the water flowing over the weir E³, in the weir box E, is divided, by forming a plurality of V notches in the upper edge of the weir E³. The apparatus herein disclosed for measuring water in this manner, while novel with me, is not specifically claimed in this case, but is so claimed in an application filed by me as a division of this case. In the construction illustrated in Figs. 18 to 25, there are three notches formed in the upper edge of the weir $E^8$. These notches are alike, in that the bottoms of the notches are on the same level, and that the sides of each notch are straight. It is not essential however that the angle between the two sides of each notch should be the same, and, in the construction illustrated, the angle between the sides of the one notch $E^5$ is substantially more acute than the angles between the sides of the two notches $E^6$. With this arrangement the flow through any one of the weir notches and in particular through the notch $E^5$ will be a constant fraction of the total flow through all the notches regardless of the variations in the total flow. The gage glass $I^{50}$ connected at top and bottom to the compartment $E'$ above and below the water level therein will, in conjunction with a proper scale indicate the rate of flow.

In the construction shown in Figs. 18 and 19, the stream of water passing through notch $E^5$ discharges into a receptacle $E^7$ located within the compartment $E^2$ and passes therefrom through a pipe $V'$ to an external water meter V from which it passes back to the compartment $E^2$ proper, and mingles with the water passing directly into that compartment through the notches $E^6$.

In the arrangement shown in Figs. 20 and 21, the water passing through the notch $E^5$, is measured by a tilting liquid measuring device of common type located within the compartment $E^2$ of the receptacle E. In the form shown this tilting device comprises a double ended pivoted trough or chute W which, when tilted in one direction discharges into one, and when tilted in the other direction discharges into the other of a pair of similar tilting buckets or receptacles $W'$. Each of the tilting receptacles is pivoted at $W^2$ at one side of and below the center of gravity of the bucket when filled and is counterweighted as by the weight $W^3$ secured to it above the pivotal axis $W^2$ so that each bucket while filling occupies the position occupied in Fig. 21 by the front bucket, but after receiving a predetermined weight of liquid tilts into the position occupied in Fig. 21, by the rear bucket, remaining in the latter position until emptied. Each bucket is provided with a siphon discharge pipe $W^4$ by means of which the bucket is emptied when tilted into the discharge position. Each bucket $W'$ as it tilts forward after being filled turns the chute W into the position in which the stream of water passing through the notch $E^5$ is diverted to the other bucket. The tilting chute W operates an external register or counting train $R^{10}$ by means of a rod $W^5$ extending through the wall of the weir box E.

In the construction shown in Fig. 22, the water passing through the weir notch $E^5$ collects in a receptacle $E^7$ as in Figs. 18 and 19. In this form of the invention the receptacle $E^7$ discharges directly but intermittently into the compartment $E^2$. The discharge provisions comprise a siphon pipe $W^4$ which begins to discharge the receptacle $E^7$ as soon as the water level rises to the top of the pipe and continues thereafter to discharge the receptacle $E^7$ until the latter is empty. A float $H^6$ rising and falling as the receptacle $E^7$ fills and empties actuates an external counting train or registering device $R^{10}$ once for each time that the receptacle is filled and emptied.

In the construction shown in Figs. 23 and 24 the water passing into the receptacle $E^7$ through the notch $E^5$, as in Figs. 18, 19 and 22, passes out through the pipe Y, the latter being formed with a trap or seal portion $Y'$ deep enough to prevent the passage through it of air into or steam out of the receptacle $E^7$, as the pressure in the receptacle $E^7$ varies through its ordinary range. The pipe Y discharges into a tank $Y^2$ which is supported by a weighing mechanism comprising the counterweighted balancing levers $Y^3$. The tank $Y^2$ is intermittently emptied and the water discharged into it returned into the compartment $E^2$ of receptacle E by a steam pump Z, $Z'$ representing the inlet pipe to the water cylinder of the pump, and $Z^2$ the delivery pipe. A valve $Y^4$ in the pipe Y and a valve $Z^3$ in the steam supply pipe $Z^4$ of the pump Z are arranged to be alternately and intermittently opened and closed by the three armed lever $Y^5$, connected to the lever $Y^6$. The latter is located in the tank $Y^2$ and at its lower end carries a float $Y^7$. At its fulcrum end the lever $Y^6$ is formed with a segment $Y^8$ (see Fig. 24) having one straight sided notch $Y^9$ and a rounded notch $Y^{10}$ formed in its periphery. When the parts are in the positions shown in the drawing and the receptacle $Y^2$ is filling up, a rod $Y^{11}$ passing loosely through a bracket arm $Y^{12}$ above the top of the receptacle $Y^2$ enters the notch $Y^9$ and holds the float down against the bottom of the tank. In this condition of the apparatus the valve $Z^3$ is closed and the valve $Y^4$ is open. When the tank $Y^2$ fills up with water to such an extent that the weight of the tank and contents overcomes the lifting action of the balance levers $Y^3$, and the tank descends. The rod $Y^{11}$ being prevented from dropping by the nut or head $Y^{13}$, then passes out of the notch $Y^9$. When this occurs the float moves upward and through the lever $Y^5$ closes the valve $Y^4$ and opens the valve $Z^3$. This starts the pump Z in operation. While the tank $Y^2$ is being emptied thus, the water passing through the notch $E^5$ of the weir accumulates in the receptacle $E^7$ which should be of suitable capacity to hold the water flowing through the notch $E^5$ while the tank $Y^2$ is being emptied. As soon as the discharge from the tank $Y^2$ begins, the latter rises to the normal level, but this, of course does not affect, in itself, the valves $Y^4$ and $Z^3$. Wire drawing or throttling the valves is prevented by the entrance of the lower end of the rod $Y^{11}$ into the notch $Y^{10}$ which prevents the float $Y^7$ from returning to the bottom of the tank while the water therein exerts any flotative effect on the latter. When the water ceases to exert any lifting effect on the float the friction between the rod $Y^{11}$ and the wall of the notch $Y^{10}$ is no longer sufficient to prevent the float from dropping, and when the float drops, it drops far enough so that the rod $Y^{11}$ can enter the notch $Y^9$. The number of times the tank $Y^2$ is filled and subsequently emptied may be registered by the register $R^{10}$ actuated in any suitable way, as by a connection to the lever $Y^5$.

The arrangement shown in Fig. 25. resembles that of Fig. 23, in that the water from the receptacle $E^7$ is discharged through a pipe Y into an external measuring tank receptacle $Y^{20}$ and that the latter is intermittently emptied by a steam pump Z. In Fig. 25, however, there is no automatically controlled valve in the pipe Y. The tank $Y^{20}$ is stationary and the valve $Z^3$ from the steam pipe $Z^4$ of the pump is intermittently opened and closed by a float $H^{20}$. The lever carrying the float $H^{20}$ has an arm $H^{21}$ connected by a pin and slot connection to the rod $Z^5$ for operating the valve $Z^3$, so that the valve $Z^3$ after being opened on the filling of the tank $Y^{20}$ will stay open until the tank is emptied and the float $H^{20}$ descends to the bottom of the tank. The float $H^{20}$ operates a counting device $R^{10}$.

With the apparatus shown in Figs. 22 and 25, it is apparent that inaccurate results will be obtained with varying rates to flow over the weir, since varying quantities of water will then overflow into and out of the receptacle $E^7$ during the periods in which the latter is being discharged. Such inaccuracy is prevented with the arrangement shown in Figs. 18, 21 and 23. It is to be observed also that the siphon discharge employed in Figs. 20, 21 and 22 is not suitable for use where the water measured exceeds a temperature of about 206° Fahrenheit, as with water hotter than this the necessary unbroken column of water in the siphon discharge pipe will not be maintained.

It will be apparent to those skilled in the art that the avoidance of eddy currents and undesirable disturbances in the level of the liquid on the supply side of the weir, the equalization of pressures in the weir chamber and heater, and the regulation of the water flow in the system as a whole, obtained with the arrangement of the weir chamber with respect to the water heating and measuring systems described, all contribute toward the production of a satisfactory and efficient water heating and measuring plant regardless of whether the flow is determined by measuring the height of water level on the supply side of the weir directly as by means of a float or indirectly by the hydrostatic method, or is determined by measuring the amount of liquid flowing in one of several streams into which the weir divides the total flow.

While in accordance with the provisions of the statute I have illustrated and described the best forms of my invention now known to me it will be apparent to those skilled in the art that changes in the form of apparatus disclosed may be made without departing from the spirit of my invention, and that in certain cases, some features of the invention may be employed with advantage without a corresponding use of other features, and that in general, the form of apparatus embodying my invention, which is most advantageous to employ will depend upon the particular conditions of use.

Having now described my invention, what I claim as new and desire to secure by Letters Patent, is:

1. In combination, an open water heater comprising a tank and a filter screen located in the lower end thereof, a measuring chamber attached to said tank, a weir dividing said measuring chamber into two compartments, one of which is open to said tank below said screen, and provisions for measuring the flow of water over the weir.

2. In combination a measuring receptacle, a weir located therein and dividing it into two compartments, and an open water heater of the type specified, with a hot water discharge connection to one of said compartments, a service discharge connection leading from the other compartment, means responsive to the rise and fall of the water level in said other compartment for controlling the admission of water to be heated to said heater, and provisions for measuring the flow of water over the weir.

3. In combination, a measuring receptacle, a weir located therein and dividing it into two compartments, an open water heater of the type specified with a hot water discharge connection to one of said compartments, a service discharge connection leading from the other compartment, a steam pressure equalizing connection between the steam space of the water heater and the steam space of the measuring receptacle, and provisions for measuring the flow of water over the weir.

4. In combination, a measuring receptacle, a weir located therein, and dividing it into inlet and outlet compartments, and an open water heater of the type specified with a hot water discharge connection to said inlet compartment and an overflow connection limiting the height of the water level in said heater, a service discharge connection leading from said outlet compartment, said outlet compartment having a water receiving space below the lowermost level of flow over said weir more than sufficient to hold all the water which can accumulate in said inlet compartment and said tank between said last mentioned level and the overflow level of the heater, and provisions for measuring the flow of water over the weir.

5. In combination, a measuring receptacle, a weir located therein, and dividing it into inlet and outlet compartments, and an open water heater of the type specified with a hot water discharge connection to said inlet compartment and an overflow connection limiting the height of the water level in said heater, a discharge connection leading from said outlet compartment, said outlet compartment having a water receiving space below the lowermost level of flow over said weir more than sufficient to hold all the water which can accumulate in said inlet compartment and said tank between said last mentioned level and the overflow level of the heater, means responsive to the rise and fall of the water level in said outlet compartment for controlling the admission of water to be heated to said heater, and provisions for measuring the flow of water over the weir.

6. In combination, a measuring receptacle, a weir located therein and dividing it into inlet and outlet compartments, and an open water heater of the type specified with a hot water discharge connection to said inlet compartment and an overflow connection limiting the height of the water level in said heater, a discharge connection leading from said outlet compartment, a water supply connection and an auxiliary water supply connection to the heater, means responsive to the rise and fall of the water level in said outlet compartment for controlling the admission of water to said heater through said auxiliary supply connection, and provisions for measuring the flow of water over the weir.

7. In combination, a measuring receptacle, a weir located therein and dividing it into inlet and outlet compartments, and an open water heater of the type specified with a hot water discharge connection to said inlet compartment and an overflow connection limiting the height of water level in said heater, a discharge connection leading from said outlet compartment, a water supply connection and an auxiliary water supply connection to the heater, means responsive to the rise and fall of the water level in said outlet compartment for preventing the admission of water to said heater through said auxiliary supply connection when the water in said outlet compartment rises to one level and for preventing the admission of water through the first mentioned water supply connection when the water level in said outlet compartment rises to a still higher level, and provisions for measuring the flow of water over the weir.

GEO. H. GIBSON.

Witnesses:
   FRANK S. BROADHURST,
   WILBERT SAILER.